United States Patent Office 3,164,995
Patented Jan. 12, 1965

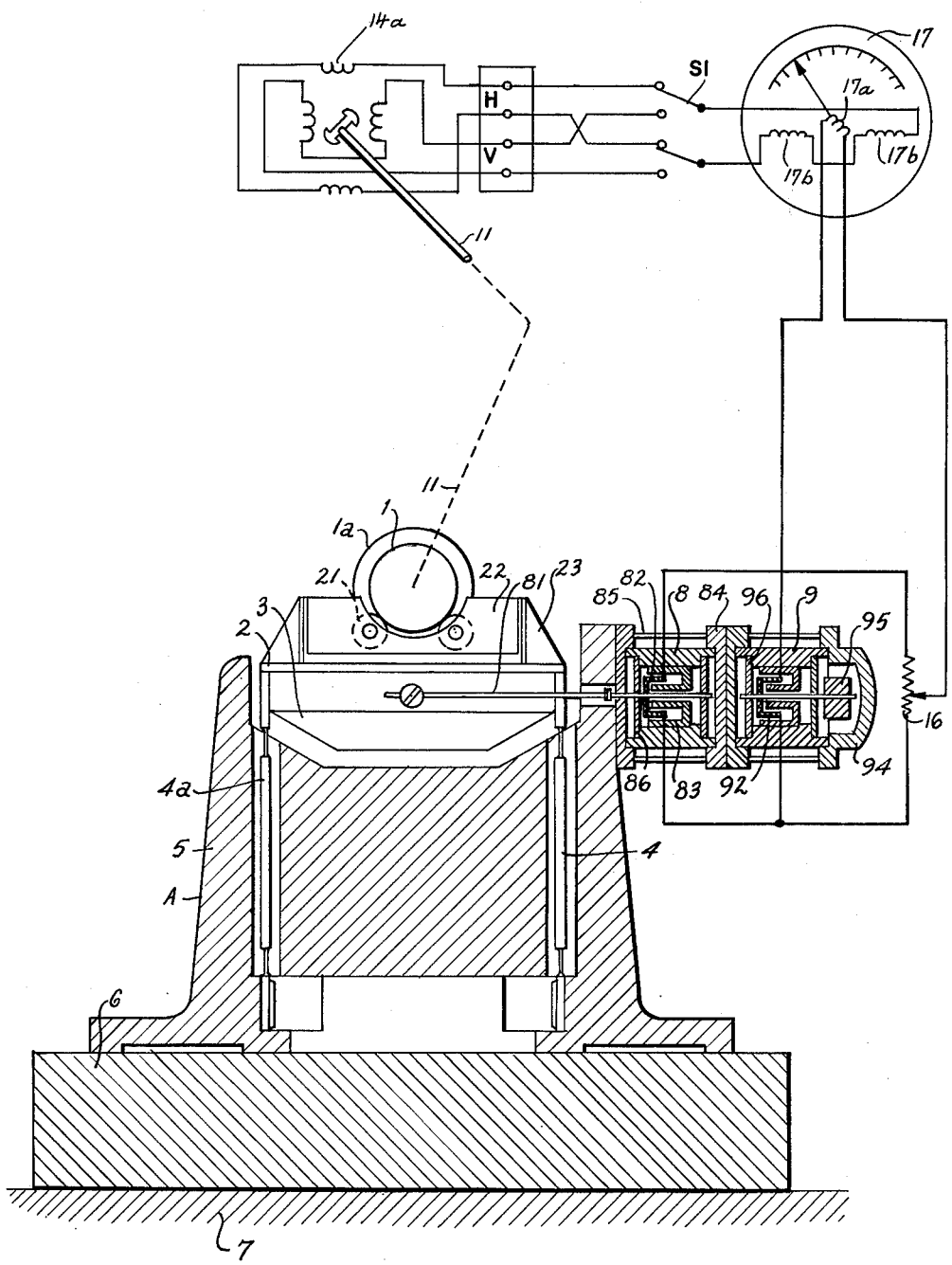

3,164,995
METHOD AND MEANS FOR COMPENSATION OF FRAME OSCILLATIONS IN WORKPIECE BALANCING OPERATIONS
Klaus Federn and Otfrid G. H. Maus, Darmstadt, Germany, assignors to Carl Schenck Maschinenfabrik G.m.b.H., Darmstadt, Germany, a corporation of Germany
Filed May 22, 1961, Ser. No. 111,555
7 Claims. (Cl. 73—462)

My invention relates to methods and means for determining the unbalance of a rotatable workpiece by rotating the workpiece upon an oscillatable bridge and measuring the oscillations which the rotating workpiece imparts to the bridge. Such bridges are generally mounted on a machine frame structure and a pickup device generally senses the oscillation of the bridge relative to the frame. The invention more particularly relates to methods and means for compensating measuring errors which oscillation of the frame introduces.

Balancing machines employing oscillation pickups located between a frame structure and an oscillation bridge for response to bridge oscillations due to unbalance of a rotating workpiece during its measuring run, possess the advantage of simple structure. Such pickups generally include a housing fastened to the frame structure and a sensor member of comparatively small mass, such as a moving coil, connected with the oscillation bridge. This type of pickup is reliable only when mounted upon a sufficiently stiff frame structure free of oscillations so that the pickup housing can be viewed as fixed in space. This is because the reference point against which the oscillations of the bridge must be measured, that is to say, the reference point upon the frame structure, must necessarily occupy a fixed point in space. This requirement is not satisfied when externally induced oscillations, such as vibrations of the ground or floor, maintain the reference point in a state of motion. In this condition, when the machine frame or pickup housing itself oscillates, it enters into the pickup an additional oscillatory component which falsifies the response of the sensing member.

The requirement that the frame structure be sufficiently stiff to be free of oscillations so that the reference point of the pickup at the frame structure can be viewed as being fixed in space is not satisfied by even the best of available balancing machines when the workpiece rotates at very high speeds or when extremely exacting accuracy requirements of modern technology must be met.

It had been previously expected that this additional error component of oscillation could be remedied by mounting the pickup housing in oscillatorily isolated relation to the machine frame on which the workpiece is journalled, and giving the pickup mounting a tuning sufficiently below its natural frequency. However, when operating at low rotational speeds this expedient entails the particularly disturbing disadvantage that the oscillatory system at each workpiece-journalling bridge is given at least one additional degree of freedom of motion. The resulting intercoupling of individual frequencies may dislodge the individually favorable tuning of the oscillation bridge or of the oscillation pickups. Moreover, as a result of this mounting the system becomes susceptible to spurious oscillations stemming, for example, from the oscillation bridges or wind forces operating directly upon the oscillation pickup housing.

Furthermore, modern technology requirements have significantly increased the accuracy demanded of balancing machines for some types of rotors. If such exacting standards are to be satisfied, the unbalance measurements must be particularly insensitive to oscillations prevailing in the frame structure or in the base upon which the frame rests, and having the same frequency as the unbalance oscillations. Otherwise, the normally sufficient filtering effect achieved by a watt-metric measuring instrument alone is no longer satisfactory. It is then either necessary to install the entire balancing machine as a unit in an oscillation isolating manner or, when using machines of the conventional type, to oscillatingly isolate the fixed portions of the pickup relative to the machine frame structure. Such isolation should be accomplished so that no portion, or only a negligible portion of at most 15% for example, of the oscillations of the frame structure can be transmitted to the housing of the oscillation pickup. Even under favorable conditions these expedients are unsuccessful if the workpiece itself causes spurious oscillations, for example by means of loose turbine buckets or vanes or when the wind or air resistance is appreciable. Such spurious oscillatory pulses excite not only the journalling bridges to perform natural oscillations but also act upon the pickup housings and may result in the formation of coupling or beat oscillations between both.

It is an object of my invention to eliminate such deficiencies and to devise a method and means for compensating oscillation errors sensing or measuring which may be introduced into the balance test result by frame oscillation.

To this end and in accordance with a feature of my invention, I measure or derive a criterion dependent upon the error introduced into the pickup, and I also measure or derive another criterion that depends upon the resultant effect of the error plus the unbalance of the workpiece, and I then compare the two criteria with each other, such comparison producing a result indicative of pure unbalance.

According to another feature of the invention, I measure or derive a criterion dependent upon the frame oscillatory error, that is upon the error introduced by oscillations imparted to the pickup by the machine frame on which the worpkiece is journalled. I further measure or derive another criterion that depends upon the resultant effect of the same frame oscillatory error plus the unbalance of the workpiece; and I then compare the two criteria with each other, such comparison being superimposed by suitable instrumentalities which produce a mathematical result which is indicative of the pure unbalance and free of spurious oscillations at the reference point. By virtue of this result, a normal frame structure of customary stiffness may be used and it is not necessary to install the entire machine in an oscillation isolating manner nor to oscillatingly isolate the fixed housing of the pickups relative to the machine frame structure.

The above-mentioned comparison of the individual respective criteria is effected, according to the invention, by means of a mathematical operation, for example addition or subtraction. Those components of the critical data derived and presented, which are only the spurious oscillation of the reference point, are thus eliminated. The resulting criteria mathematically derived from the above-mentioned components are supplied to an indicating instrument.

According to another feature of my invention, the absolute oscillating response required to obtain the first and the above-mentioned criteria is performed such that it measures oscillations at the locus of the relative oscillation response. Thus, an inertial body is connected to one side of an oscillation-responsive sensing member and the other end of the sensing member is connected to the frame housing. The electric values measured by the sensing device are then wattmetrically combined with the electric values obtained from an oscillatory sensing device secured to the frame and connected to sense oscillation of the bridge.

The above-mentioned and other objects, advantages and features of my invention will be apparent from and will be mentioned in the following, more detailed description in conjunction with the single figure of the drawing which illustrates by way of example a balancing machine according to the invention in schematic, sectional elevation.

The rotating mechanism for the machine is substantially as described for FIGS. 1 and 2 in the copending application of Heinrich Hack, Serial No. 746,977, now abandoned, assigned to the same assignee as this application.

Referring to the drawing, 1 denotes one of the two shaft ends of a specimen or workpiece 1a. Each shaft end is journalled in a bearing 2 of a balancing machine A. Each bearing comprises two carrier rollers 21 in a holder 22 of a supporting structure 23 mounted on a vibratory or oscillatory bridge 3 of the balancing machine A. The bridge 3 receives its support from strut springs 4 and 4a so that it can perform only horizontal oscillations extending perpendicular to the axis 11 of the workpiece rotation. The strut springs 4 and 4a are fastened on a housing 5 of the machine frame structure. Spokes and grooves of a machine bed 6 secure the housing 5, the bed 6 being in turn fastened by screw bolts to the building foundation upon which the machine rests.

The pickup 8 is a sensing member of the conventional, preferably electrodynamic or moving coil type, and possesses a housing 84 fastened by bolts 85 to the housing 5 of the machine structure. The sensing rod pickup 81 secured to a moving coil 82 responds to oscillations of the bridge 3 due to unbalance of the workpiece 1. A diaphragm 86 centrally guides the sensing rod pickup 81 and the coil 82 in the air gap of the appertaining magnet 83.

A pickup 9 in coaxial relation to the relative pickup 8 and of similar design provides absolute oscillation sensing. Screw bolts 85 rigidly fasten the housing of the pickup 9 to the housing 84 of the pickup 8. Consequently, the pickup housings 84 and 94 are subjected to the faulty or spurious oscillations issuing from the machine frame housing 5. Only the one component of the oscillations from the frame housing, extending in the measuring direction at the sensing location, is actually disturbing. Because of the rigid connection of housings 84 and 95, there obtains at the location of the second moving coil 92 the same faulty or disturbing oscillation as at the location of the first moving coil 82.

The absolute pickup is properly tuned relative to the natural frequency. The latter is accomplished by means of mass 95 which is guided by diaphragm 96 in the pickup housing 94. The natural frequency of the guided mass 95 remains sufficiently below the lowermost rotational speed used for balancing purposes. The voltage U92 sensed because of the relative speed between a moving coil 92 and a suitable magnet secured to the housing 94 or housing 84 which occurs at the ends of the windings on the moving coil 92, is alway proportional to the oscillation of the frame housing and hence the error oscillation at the location of the moving coil 82. This moving coil issues a voltage U82 which is proportional to the difference of the journalling bridge oscillation and the error oscillation at the moving coil 82.

According to a feature of the invention, the sensitivities of the two pickups 8 and 9 are correctly matched to each other. This is accomplished in the usual manner by way of shunt resistors across the pickups or preferably by way of a potentiometer 16.

A measuring instrument 17 of wattmetric type superimposes both voltages in the inverse ratio of the respective sensitivities of the pickups. The measuring instrument 17 then obtains a resultant voltage which is free of the voltage component that was caused by the error or frame-produced oscillation. The instrument 17 includes a moving coil 17a and a pair of field coils 17b. These receive signals by way of a switch S1 from either the horizontal (sine) or vertical (cosine) stator windings of a generator 14a. The generator 14a receives a mechanical excitation in fixed phase relation to the rotation of the workpiece 1a by means of a shaft connecting the rotor of the generator to the rotating workpiece.

As will be noted, the oscillation measurements accomplished by the pickup 8 occur at one end of the bridge and are valid for one plane. That plane is transverse to the workpiece axis and corresponds to position of the sensing rod 81. The invention contemplates a second pickup in another plane transverse to the workpiece axis. This pickup is identical to pickup 8 and incorporates another compensating pickup 9 along with another generator 14a and meter 17. This pickup accomplishes the same result as the pickup shown.

In operation the workpiece 1a is rotatable by means (not shown) in the bearings 2. Any unbalance results in vibration and oscillation of the bridge 3. Pickup 8 senses these vibrations and emits a voltage U82 to the potentiometer 16. Vibrations of the frame structure 5 relative to the mass 95 (i.e., the absolute reference), cause another voltage to appear at potentiometer 16. These voltages are compared by the potentiometer and read by the wattmetric meter 17. The reading by the meter 17 first occurs with switch S1 in one position and then in the other. This produces readings corresponding to the outputs from both the sine and cosine stator windings in generator 14a. The generator is rotated at the speed of the workpiece by an interconnecting shaft coupling. The two readings correspond to two position components in the measuring plane of rod 81.

It will be apparent to those skilled in the art upon a study of this disclosure that my invention permits of various modifications and alterations with respect to the individual machine components and method steps disclosed and hence can be embodied in equipment other than particularly illustrated and described herein, without departing from the essential features of the invention and within the scope of the claims annexed hereto.

We claim:

1. The method of compensating for errors due to frame oscillations in unbalance measurements on a rotating workpiece mounted on a frame comprising, translating during rotation the over-all oscillations of the workpiece relative to the frame into a first component physical magnitude which depends upon the frame oscillations as well as upon unbalance inherent in the workpiece, simultaneously translating during rotation of the workpiece the oscillatory deviation of the frame from a fixed position in space into a second component physical magnitude, and applying said two component magnitudes against each other to arrive at a resultant magnitude indicative only of said inherent unbalance.

2. The method of compensating for errors due to frame oscillations in unbalance measurements on a rotating workpiece mounted on a frame comprising, translating during rotation of the workpiece the oscillations of said frame into a first component physical magnitude, simultaneously translating the oscillations of said workpiece relative to said frame into a second physical magnitude and measuring a difference value of said two magnitudes as indicative of the workpiece unbalance.

3. The method of compensating for errors due to frame oscillations on rotating workpieces mounted on a frame comprising, translating during rotation of the workpiece the oscillations of the frame into a first alternating voltage, simultaneously translating the over-all oscillation of the workpiece relative to said frame into a second alternating voltage, measuring a differential result of said two voltages as indicative of the workpiece unbalance, and comparing the result with a reference voltage synchronous with and in fixed relation to the workpiece rotation whereby an error-compensating indication of workpiece unbalance is obtained.

4. Apparatus for determining unbalance of a rotating workpiece comprising a frame, a workpiece supporting structure oscillatorily mounted on said frame, a first transducer mounted on said frame coactively related to said structure for response during rotation of the workpiece to oscillation of said structure relative to said frame, a second transducer mounted on said frame for response during rotation to absolute oscillation of said frame, receiver means for response to workpiece unbalance, said receiver means comprising a phase reference transmitter connected to said workpiece and driven together with the said workpiece and having an alternating output voltage synchronous with said rotation, said two transducers being connected with said receiver means in opposed relation to each other whereby the response of the receiver means is dependent substantially only upon the inherent unbalance of the workpiece.

5. Apparatus for determining unbalance of a rotating workpiece comprising, a frame, a structure oscillatorily mounted on said frame and including workpiece holding means, a first transducer mounted on said frame and coactively related to said structure for response during workpiece rotation to oscillations of said structure relative to said frame, a second transducer mounted on said frame for response during workpiece rotation to oscillations of said frame, and means to measure the difference in outputs of said two transducer means, whereby the response of said last-mentioned means is dependent substantially only upon the inherent unbalance of the workpiece.

6. Apparatus for determing unbalance of a rotating workpiece comprising a frame, a workpiece supporting structure oscillatorily mounted on said frame, a first oscillation pickup mounted on said frame in coactive relation to said structure and having a voltage response to oscillation of said structure due to frame oscillation as well as to inherent unbalance of the workpiece, a second oscillation pickup mounted on said frame and having a voltage responsive to the oscillation of said frame, and circuit means connecting said two pickups in mutually opposed voltage relation.

7. Apparatus for determining unbalance of a rotating workpiece comprising a frame, a structure oscillatorily mounted on said frame including workpiece holding means, a first oscillation pickup mounted on said frame in coactive relation to said structure and having a voltage responsive to oscillation of said structure due to frame oscillations as well as to inherent unbalance of the workpiece, a second oscillation pickup mounted on said frame and having a voltage responsive to the oscillation of said frame, a phase reference transmitter connected to said workpiece and driven together with the said workpiece and having an alternating output voltage synchronous with said rotation, a receiving instrument having a field coil and a moving coil, and circuit means connecting said two pickups in mutually opposed voltage relation to one coil of said instrument, said transmitter being connected to the other coil of said instrument whereby the response of said instrument is indicative of substantially only the unbalance inherent in the workpiece.

References Cited in the file of this patent
FOREIGN PATENTS
1,199,148    France _____ June 15, 1959